(12) United States Patent
Zettel et al.

(10) Patent No.: US 9,527,495 B2
(45) Date of Patent: Dec. 27, 2016

(54) VEHICLE SYSTEMS AND METHODS WITH IMPROVED HEATING PERFORMANCE

(71) Applicant: GM GLOBAL TECHNOLOGY OPERATIONS LLC, Detroit, MI (US)

(72) Inventors: Andrew M. Zettel, Port Moody (CA); Norman J. Weigert, Whitby (CA); Mark A. Manickaraj, Scarborough (CA); Anthony H. Heap, Ann Arbor, MI (US); Richard A. Marsh, Beverly Hills, MI (US); Aniket Kothari, Rochester Hills, MI (US); Michael R. Colville, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 14/567,236

(22) Filed: Dec. 11, 2014

(65) Prior Publication Data

US 2016/0167640 A1    Jun. 16, 2016

(51) Int. Cl.
*B60W 10/06*    (2006.01)
*B60W 10/08*    (2006.01)
(Continued)

(52) U.S. Cl.
CPC .............. *B60W 10/08* (2013.01); *B60H 1/004* (2013.01); *B60H 1/00385* (2013.01); *B60H 1/00764* (2013.01); *B60W 10/06* (2013.01); *B60W 10/26* (2013.01); *B60W 20/12* (2016.01); *B60H 1/00878* (2013.01); *B60W 2510/244* (2013.01);
(Continued)

(58) Field of Classification Search
CPC . B60H 1/00764; B60H 1/00385; B60H 1/004; B60H 1/00392; B60H 1/00892; B60H 1/00878; B60W 30/182; B60W 50/0098; B60W 10/08; B60W 20/12; B60W 10/26; B60W 10/06; B60W 2710/0677; B60W 2720/103; B60W 2510/244; B60W 2710/086; B60W 2710/244; B60W 2550/402; B60W 2550/12; B60L 2240/34
See application file for complete search history.

(56) References Cited

U.S. PATENT DOCUMENTS

| | | | | |
|---|---|---|---|---|
| 2009/0114463 A1* | 5/2009 | DeVault | ................. | B60K 6/365 180/65.29 |
| 2011/0004392 A1* | 1/2011 | Senda | ................... | F02P 5/1516 701/102 |

(Continued)

*Primary Examiner* — Jason Holloway
(74) *Attorney, Agent, or Firm* — Lorenz & Kopf, LLP (57) ABSTRACT

A vehicle system includes an electric motor, an internal combustion engine, and a heating system configured to transfer heat from the internal combustion engine to a passenger compartment of the vehicle. The system includes a controller configured to operate the electric motor and the internal combustion engine according to one of a plurality of drive cycle profiles. The controller selects the drive cycle profile based on an ambient temperature. The drive cycle profiles include a first drive cycle profile that commands power from the electric motor until the battery system reaches a predetermined state of charge and subsequently commands power from the internal combustion engine and a second drive cycle profile that commands power from the internal combustion engine and subsequently commands power from the electric motor.

18 Claims, 4 Drawing Sheets

(51) Int. Cl.
*B60H 1/00* (2006.01)
*B60W 10/26* (2006.01)

(52) U.S. Cl.
CPC .... *B60W 2550/12* (2013.01); *B60W 2550/402* (2013.01); *B60W 2710/0677* (2013.01); *B60W 2710/086* (2013.01); *B60W 2710/244* (2013.01); *B60W 2720/103* (2013.01)

(56) References Cited

U.S. PATENT DOCUMENTS

| | | | | |
|---|---|---|---|---|
| 2011/0202234 | A1* | 8/2011 | Bradley | B60K 6/48 701/36 |
| 2011/0298241 | A1* | 12/2011 | Varns | B60H 1/00278 296/64 |
| 2013/0192271 | A1* | 8/2013 | Barnhart | F25B 21/04 62/3.3 |
| 2013/0332013 | A1* | 12/2013 | Malone | B60H 1/004 701/22 |
| 2014/0041179 | A1* | 2/2014 | Bradley | B60K 6/48 29/401.1 |
| 2014/0158784 | A1* | 6/2014 | Lundberg | F01P 7/14 237/5 |

* cited by examiner

VEHICLE SYSTEMS AND METHODS WITH IMPROVED HEATING PERFORMANCE

TECHNICAL FIELD

The present invention generally relates to vehicle systems and methods, and more particularly relates to vehicle systems and methods with improved heating performance.

BACKGROUND

In recent years, advances in technology have led to substantial changes in the design of automobiles. One of the changes involves the complexity of the electrical systems within automobiles, particularly alternative fuel vehicles, such as hybrid, battery electric, and fuel cell vehicles. Such alternative fuel vehicles may use one or more electric motors in combination with internal combustion engines to drive the wheels. With fluctuations in fossil fuel prices, it is now more desirable than ever to power automobiles with the electric power of the electric motor.

Generally, heating systems in vehicles rely upon heat from the internal combustion engine to provide heat to the passenger compartment. This becomes an issue at low temperatures during operation with the electric motor. However, as noted above, it is generally desirable from a fuel perspective to operate the vehicle with the electric motor. As a result of this arrangement, operator comfort may be compromised at lower temperatures until the battery power of the electric motor is depleted and internal combustion engine operation is initiated.

Accordingly, it is desirable to provide vehicle systems and methods with improved heating performance, particularly in vehicles that use an internal combustion engine and an electric motor. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a system for a vehicle includes a battery system and an electric motor coupled to the battery system and configured to selectively provide power to the vehicle with energy from the battery system. The system further includes an internal combustion engine configured to selectively provide power to the vehicle and a heating system configured to transfer heat from the internal combustion engine to a passenger compartment of the vehicle. The system includes a controller configured to operate the electric motor and the internal combustion engine according to one of a plurality of drive cycle profiles. The controller selects the drive cycle profile based on an ambient temperature. The drive cycle profiles include a first drive cycle profile that commands power from the electric motor until the battery system reaches a predetermined state of charge and subsequently commands power from the internal combustion engine and a second drive cycle profile that commands power from the internal combustion engine and subsequently commands power from the electric motor.

In accordance with another exemplary embodiment, a method is provide for operating a vehicle with an electric motor that provides power to the vehicle with energy from the battery system, an internal combustion engine, and a heating system that transfers heat from the internal combustion engine to a passenger compartment of the vehicle. The method includes receiving an initial location and an intended destination; generating a trip profile for a trip between the initial location and the intended destination; receiving, by a controller, an ambient temperature; selecting, by the controller, a drive cycle profile from a plurality of drive cycle profiles based on the trip profile and the ambient temperature; and operating the vehicle according to the selected drive cycle profile. The drive cycle profiles include a first drive cycle profile that commands power from the electric motor until the battery system reaches a predetermined state of charge and subsequently commands power from the internal combustion engine and a second drive cycle profile that commands power from the internal combustion engine and subsequently commands power from the electric motor.

In a further exemplary embodiment, a heating performance system is provided for a vehicle with an electric motor and an internal combustion engine. The heating performance system includes a trip module configured to generate a trip profile for a trip between an initial location and an intended destination; a drive cycle module coupled to the trip module and configured to generate at least a first drive cycle profile and a second drive cycle profile based on the trip profile; and a controller coupled to the drive cycle module and configured to select between the first drive cycle profile and the second drive cycle profile based on an ambient temperature for operation of the vehicle according to the selected drive cycle profile. The first drive cycle profile commands propulsion power from the internal combustion engine at a first position during the trip profile and the second drive cycle profile commands propulsion power from the internal combustion engine at a second position during the trip profile, earlier than the first position. The controller is configured to select the second drive cycle profile when the ambient temperature is less than a predetermined temperature such that heat from the internal combustion engine is directed into a passenger compartment of the vehicle earlier in the trip profile.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Figure 1:
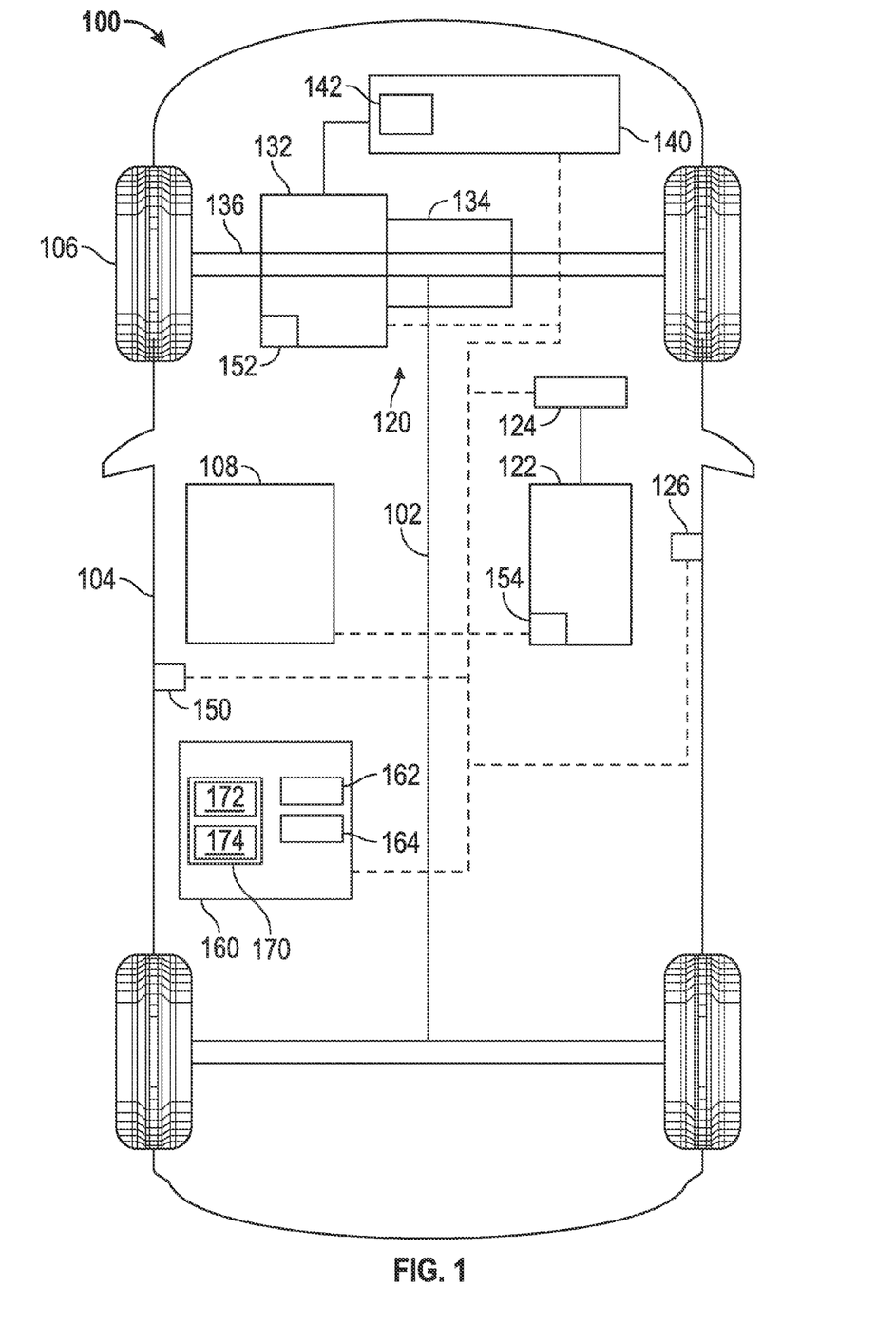
FIG. 1 is a schematic block diagram of a vehicle with a heating performance system in accordance with an exemplary embodiment.

FIG. 1 is a schematic block diagram of a vehicle (or automobile) 100 in accordance with an exemplary embodiment. The vehicle 100 includes a chassis 102, a body 104, four wheels 106 (although other embodiments may have two or three wheels), and an electronic control system (ECU) 108. The body 104 is arranged on the chassis 102 and substantially encloses the other components of the vehicle 100. The body 104 and the chassis 102 may jointly form a frame. The wheels 106 are each rotationally coupled to the chassis 102 near a respective corner of the body 104.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). As described below, the vehicle 100 may also incorporate any combination of a number of different types of engines and motors, and the vehicle 100 shown in FIG. 1 and described herein is merely intended as one example. It should be noted that exemplary embodiments discussed herein are applicable to other types of land vehicles, such as motorcycles and personal transportation devices, as well as other categories of vehicles, such as watercraft and aircraft.

In the exemplary embodiment illustrated in FIG. 1, the vehicle 100 includes an actuator assembly 120, a battery system (or battery) 122, a power converter assembly (e.g., an inverter assembly) 124, and a battery charge port 126. The actuator assembly 120 includes an internal combustion engine 132 and an electric motor (or motor/generator) 134. As described below, the internal combustion engine 132 and the electric motor 134 may be selectively operated to produce power for the wheels 106 via the drive shafts 136.

The internal combustion engine 132 may be a liquid or gas fueled internal combustion engine. Examples of fuels that may be used include gasoline, diesel, "flex fuel" (e.g., a mixture of gasoline and alcohol), methanol, methyl tetrahydrofuran mixtures, various biodiesels, and liquefied petroleum gas (LPG).

The electric motor 134 may be any type of motor that functions to generate mechanical power from the energy stored in the battery system 122. Typically, the electric motor 134 includes a transmission therein, and although not illustrated, also includes a stator assembly (including conductive coils), a rotor assembly (including a ferromagnetic core), and a cooling fluid. The battery system 122 may include any suitable direct current (DC) power supply or electrical energy storage device source, including a 12V, lead-acid starter-lighting-ignition (SLI) battery and/or a lithium ion battery. Although not shown in detail, in one embodiment, the power converter assembly 124 includes a three-phase circuit coupled to the electric motor 134 to selectively drive the motor 134.

The electronic control system (ECU) 108 is in operable communication with the actuator assembly 120, the battery system 122, the power converter assembly 124, and the charge port 126. Although not shown in detail, the ECU 108 includes various sensors and automotive control modules, or electronic control sub-units or modules (ECMs), such as an inverter control module and a vehicle controller, and at least one processor and/or a memory which may include instructions stored thereon (or in another computer-readable medium) for carrying out the functions described herein.

As noted above, either the electric motor 134 and/or the internal combustion engine 132 generate power to operate the vehicle 100. During operation, the ECU 108 may operate the actuator assembly 120 with any relative combination of contributions from the internal combustion engine 132 and electric motor 134. The combination of relative operation may be referenced below as a drive cycle, and the ECU 108 may store, generate, or receive drive cycle profiles associated with the drive cycles to operate the actuator system 120 in various situations, as described in greater detail below. Accordingly, the ECU 108 may generate drive cycle commands to selectively operate the internal combustion engine 132, motor 134, and associated systems. Generally, the vehicle 100 is an extended range electric vehicle (EREV), although in other embodiments, the vehicle 100 may be considered a plug-in hybrid electric vehicle (PHEV).

Due to emissions standards, consumer preference, and/or other incentives, it is generally desirable to operate with the electric motor 134 to the extent possible or feasible, e.g., such that the electric motor 134 is the sole mechanism for propelling the vehicle and the engine 132 does not operate. As a result, during typical operation, the ECU 108 operates the actuator system 120 according to a drive cycle profile in which the vehicle 100 is powered by the electric motor 134 until the energy in the battery system 122 is depleted (or has otherwise reached a predetermined minimum state of charge), at which time the internal combustion engine 132 is started to power the vehicle 100. At times, the vehicle 100 will reach the intended destination prior to depletion of the battery system 122 such that the internal combustion engine 132 is not used. In other situations, the internal combustion engine 132 is only utilized at the very end of a trip. As discussed below, the ECU 108 may receive commands from a heating performance system 160 to operate according to an alternative or modified the drive cycle profile as compared to the typical profiles described above.

The vehicle 100 may further include a heating system 140 for providing warm air to the interior or passenger compartment of the vehicle. As is generally understood, the heating system 140 typically uses one or more fluid circuits to transfer heat generated by the internal combustion engine 132 into the passenger area, e.g., based on passenger or driver commands via a console. Considering that the vehicle 100 may be a hybrid vehicle in which the internal combustion engine 132 is not operated at all times, the heating system 140 may further include a positive thermal coefficient (PTC) heater 142. The PTC heater 142 includes a heating element that is powered by the battery system 122 such that the heating system 140 may operate when the internal combustion engine 132 is not operating. In one exemplary embodiment, heat from the PTC heater 142 may not be as effective in generating heat as compared to the internal combustion engine 132. In other embodiments, the PTC heater 142 may be omitted.

The vehicle 100 may include any number of sensors to measure or otherwise derive various parameters. The sensors may include, as examples, an ambient sensor 150, an engine sensor 152, and a battery sensor 154. The ambient sensor 150 generally functions to determine the ambient or atmospheric temperature outside the vehicle and/or inside the passenger compartment. The engine sensor 152 generally functions to determine the temperature of the internal combustion engine 132. The battery sensor 154 generally functions to determine the charge of the battery system 122.

As will now be introduced, the heating performance system 160 generally functions to modify operation of the vehicle 100 to improve the heating performance, particularly with respect to heating the passenger compartment of the vehicle for operator comfort. In one exemplary embodiment, the heating performance system 160 may estimate a "warming energy" that represents the energy necessary to warm the passenger compartment to a predetermined temperature that may be set by the user and/or manufacturer. The warming energy estimation may be based on a number of factors, including the ambient temperature and operating characteristics of the driver, the heating system 140, the engine 132, and the electric motor 134. The heating performance system 160 may also function to heat designated components. As such, in further embodiments, the heating performance system 160 may estimate the energy necessary to warm these components. Additional details about these functions will be provided below.

Generally, the heating performance system 160 includes a user interface 162, a navigation module 164, and a controller 170 with a trip profile module 172 and a drive cycle module 174. Although shown in FIG. 1 as being arranged on the vehicle 100, one or more of the components of the heating performance system 160 may be located off the vehicle 100. For example, one or more functions of the navigation module 164, controller 172, and drive cycle 174 may be performed in a remote location (e.g., on a user's personal device or at a control center) and transmitted to the vehicle 100 during operation.

As described in greater detail below, the heating performance system 160 generates a drive cycle profile for operating the vehicle 100 based on the particular trip, the ambient temperature, and various other parameters. This drive cycle profile may be implemented by the ECU 108. In some exemplary embodiments, one or more components of the heating performance system 160 may be incorporated into the ECU 108 or other vehicle systems. For example, the controller 170 may be part of the ECU 108, and/or the user interface 162 may form part of a more general user interface of the vehicle 100.

The user interface 162 generally functions to enable any type of interaction between an operator (or driver) and the heating performance system 160, particularly the controller 170 of the heating performance system 160. In general, the user interface 162 may include a display device, such as a suitably configured liquid crystal display (LCD), plasma, cathode ray tube (CRT), or head-up display, graphical elements. The user interface 162 enables the user to enter data and/or control the various aspects of the heating performance system 160 discussed below. For example, the user interface 162 may be formed by interactive graphical elements rendered on a touch screen of the display device. Other user input devices may include a keyboard or keypad, a voice recognition system, a cursor control device, a joystick or knob, or the like. In further exemplary embodiments, the user interface 162 may include or otherwise interact with a consumer electronic device, such as a smartphone or tablet computer. In some embodiments, the user interface 162 may be considered part of the infotainment system that interacts with a command station. In such an embodiment, the user may input the destination into a first device (e.g., outside of the vehicle on a mobile device or personal computer) that is in communication with the command station, which in turn, provides the destination and/or additional related information to the vehicle. In general, and as described below, the user interface 162 enables an operator to input information associated with an intended destination, as well as to enable or disable a heating performance mode.

The navigation module 164 provides navigation information to the controller 170, including the current geographical location of the vehicle. In one embodiment, the navigation module 164 is realized as a global positioning system (GPS) component that derives the current position from real-time GPS data received from GPS satellites. In other embodiments, the current location may be provided by the user via the user interface 162. In other embodiments, the current location may be determined from non-GPS sources, such as sensor data, or provided from another system. The navigation module 164 may additionally receive an intended destination from the operator, e.g., via the user interface 162. In some embodiments, the navigation module 164 may infer or derive the intended destination, e.g. a common trip associated with the operator.

Based on the current location and the destination, the navigation module 164 may generate trip or route information associated with the route between the current location and the destination. In particular, this information may include, as examples, the distance, traffic, expected speed, stopping points, topography, elevation, weather, and any other suitable parameter. In some embodiments, the navigation module 164 may generate multiple routes between the current location and the destination. The multiple routes may be presented to the user via the user interface 162 for selection of the desired trip. In some exemplary embodiments, the navigation module 164 may assign a probability to each of multiple routes, and in such embodiments, the user may adjust the probability of a given route via input on the user interface 162. As such, some exemplary embodiments enable customization of the selected route, and as a result, the trip information. As described below, the trip information may be provided to the trip module 172 of the controller 170 to generate a trip profile.

The controller 170 generally functions to control operation of the heating performance system 160. The controller 170 may include at least one processor and/or a memory that may include instructions stored thereon (or in another computer-readable medium) for carrying out the processes and methods as described herein. As shown, the controller 170 may include a trip module 172 and a drive cycle module 174.

Generally, the trip module 172 is configured to receive the trip information from the navigation module 164 and generate a trip profile associated with the trip. In particular, the trip profile provides an indication or prediction of the energy load associated with trip characteristics (e.g., the distance, traffic, expected speed, stopping points, topography, elevation, weather, and the like) as a function of discrete times or distances and/or as cumulative values. As such, any parameter that impacts the energy load may be considered. In some embodiments, the energy load for a particular intended trip may additionally include vehicle parameters such as mass, tire inflation and the like. The vehicle parameters may be predetermined and/or evaluated in real time to be considered with respect to the energy load of the intended trip.

In various exemplary embodiments, the energy load may be calculated based on a hierarchy of considerations. For example, in one exemplary embodiment, speed limits and/or reported traffic flow is used to generate the anticipated energy load. For example, non-optimal speed limits (e.g., too high or too low) or high traffic density may increase the anticipated energy load. In this exemplary embodiment, the elevation profile is then considered. For example, downhill grades will decrease the energy load while uphill grades will increase the energy load. As noted above, additional parameters may be considered. In some embodiments, the anticipated energy load may be updated or adjusted at a given frequency or period to accommodate changing driving conditions.

Figure 2:
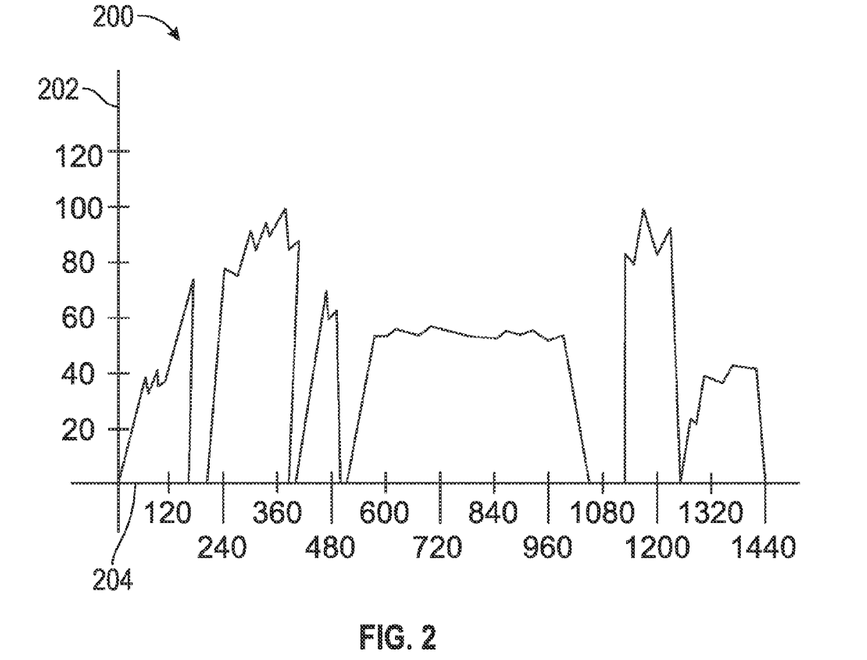
FIG. 2 is a trip profile associated with the vehicle of FIG. 1 in accordance with an exemplary embodiment.

Reference is briefly made to FIG. 2, which is an exemplary trip profile 200. The trip profile 200 in FIG. 2 depicts dynamometer driving cycles (km/h) on the vertical axis 202 as a function to elapsed time (seconds) on the horizontal axis 204. As shown, the driving profile rises and falls along the trip based on the various parameters discussed above. For example, the expected energy load of the trip profile 200 initially increases based on the anticipated trip characteristics and then drops at approximately 140 seconds due to an anticipated stop or coasting situation. As such, the trip profile 200 provides a continuous prediction of the energy load based on the particular intended trip. Although FIG. 2 depicts dynamometer driving cycles (km/h) as a function to elapsed time (seconds), the trip profile may take any suitable form.

In some embodiments, the trip module 172 may store previous trip profiles. Such trip profiles may be associated with common or frequent operator trips, such as from work to home. In such instances, the trip module 172 may retrieve a stored trip profile based on input from the operator via the user interface 162. In further embodiments, the trip module 172 may modify stored trip modules based on trip data from the actual route. In other words, the trip profile may be based on empirical data.

The controller 170 further includes a drive cycle module 174. Generally, the drive cycle module 174 generates, selects, or modifies drive cycle profiles for the ECU 108 to control operation of the actuator assembly 120. Such drive cycle profiles are based on the trip profile and other functions discussed below. Generally, the drive cycle profile includes a prediction regarding if and where the engine 132 will operate based on the battery state of charge, trip profile, outside air temperature, and other parameters, and if the drive cycle profile indicates that the engine 132 will operate, an indication of the timing of operation and non-operation to meet driver needs for efficiency, heating performance, and the like, as discussed in greater detail below. As such, the drive cycle profiles represent operating commands for the internal combustion engine 132 and the electric motor 134 to meet the anticipated energy load for the trip profile. As noted below, the relative contributions for the internal combustion engine 132 and the electric motor 134 may vary between multiple drive cycle profiles for a single trip profile. Accordingly, in addition to the specific operating commands, each drive cycle profile may include an energy load contribution for the internal combustion engine 132 and an energy load contribution for the electric motor 134.

As noted above, typically, the ECU 108 operates the vehicle 100 with electric power from the battery system 122 via the electric motor 134. However, when the battery system 122 is depleted to a predetermined level, the internal combustion engine 132 is started and the vehicle 100 operates with power from the internal combustion engine 132. As a result, to the extent possible, drive cycle profiles that use the electric motor 134 instead of the internal combustion engine 132 are favored, particularly during normal operation. However, when appropriate, the drive cycle module 174 of the heating performance system 160 may command operation according to alternative drive cycle profiles to improve heating performance, as will be discussed below.

Figure 3:
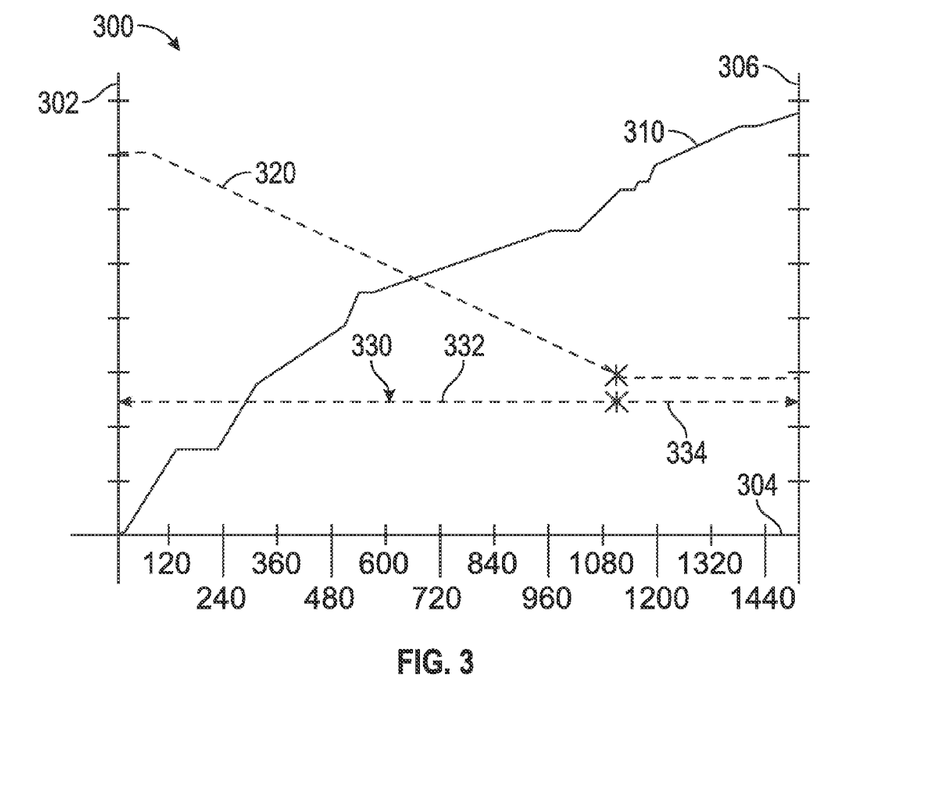
FIG. 3 is a first chart of energy usage of the vehicle of FIG. 1 in accordance with an exemplary embodiment.

Reference is briefly made to FIG. 3, which is a chart 300 that provides an example of energy usage and an associated drive cycle profile. FIG. 3 particularly depicts total energy 310 as a function of time. In FIG. 3, energy is depicted on a first vertical axis 302 and time is depicted on the horizontal axis 304. With additional reference to the instantaneous or current energy usage in FIG. 2, the total energy 310 in FIG. 3 represents the accumulation of that energy usage for a given trip profile. FIG. 3 additionally depicts the potential energy or energy remaining 320 in the battery system 122, e.g., the remaining charge in the battery system 122. As noted above, the state of charge of the battery system 122 may be determined by the battery sensor 154. In FIG. 3, battery energy (or charge) is depicted on the second vertical axis 306. As expected, the energy remaining 320 decreases as total energy 310 increases. The total energy 310 and energy remaining 320 are functions of the characteristics of the drive profile, and the cycle module 174 may determine the total energy 310 and energy remaining 320 based on the trip profiles provided by the trip module 172.

FIG. 3 additionally depicts a drive cycle profile 330 that, in one exemplary embodiment, represents a normal or typical operation. Portion 332 of drive cycle profile 330 corresponds to propulsion provided solely by of the electric motor 134, and portion 334 of drive cycle profile 330 corresponds to operation of the internal combustion engine 132 (as well as operation of the electric motor 134, which in most embodiments, operates with the internal combustion engine 132). As shown by drive cycle profile 330, during typical operation, the vehicle 100 operates only with the electric motor 134 in portion 332 until the battery system 122 reaches a predetermined energy level (e.g. at approximately 1080 seconds in the example of FIG. 3). From that point, the vehicle 100 additionally operates with the internal combustion engine 132 in portion 334 until the end of the trip. As noted above, the drive cycle 330 may represent a typical drive cycle generated by the ECU 108 and/or heating performance system 160 to operate the vehicle 100 in which electric energy is depleted prior to use of internal combustion. As also noted above, the trip profile may indicate that the trip will end prior to depleting the electric energy relative to result in a profile in which internal combustion is not used at all.

In some circumstances, as described in greater detail below, the heating performance system 160 may function to modify the typical or default drive cycle to provide improved heating performance by selecting an alternate drive cycle profile. This modification may be referred to as a heating performance mode, which may include one or more sub-modes for operating the actuator system 120 based on various considerations and/or to achieve different results.

Figure 4:
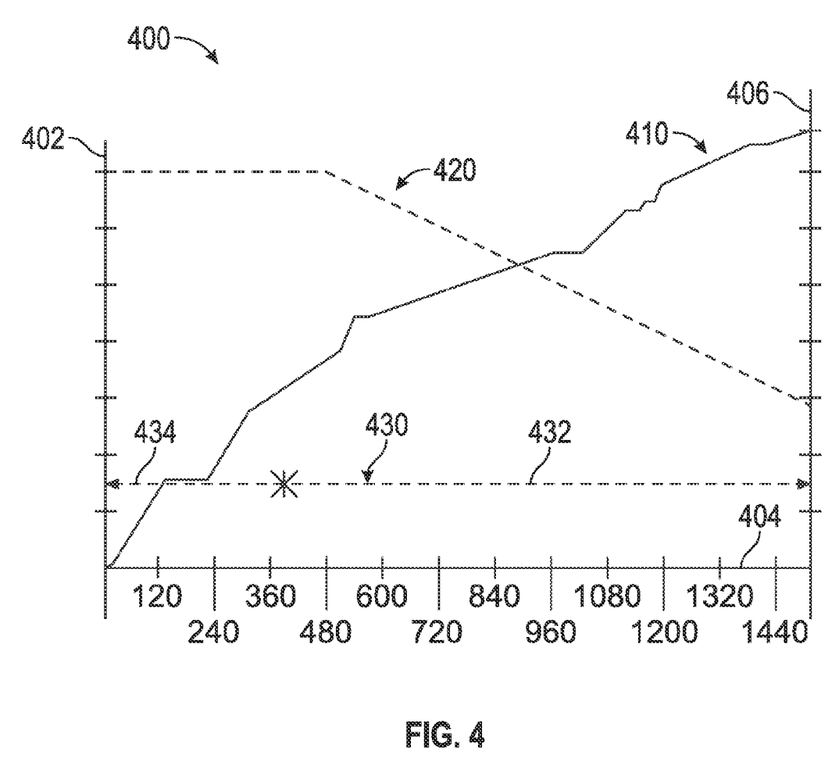
FIG. 4 is a second chart of energy usage of the vehicle of FIG. 1 in accordance with an exemplary embodiment.

Generally, operation of the internal combustion engine 132 provides a more effective source of heat than the PTC heater 142. This is particularly a concern during cold weather operation with respect to operator comfort and/or when certain vehicle components may benefit from heating. In one exemplary embodiment, the heating performance system 160 may initiate the heating performance mode to modify the drive cycle to provide combustion engine operation during times other than at the end of trip profile. FIG. 4 provides an example of one such modification of drive cycles.

FIG. 4 is a chart 400 that depicts total energy 410, remaining energy 420, and a drive cycle 430 for a trip profile corresponding to the trip profile of FIG. 2, which also formed the basis of the chart 300 of FIG. 3. As such, the total energy 410 is depicted as a function of time with energy represented on a first vertical axis 402 and time represented on the horizontal axis 404. FIG. 4 additionally depicts the potential energy or energy remaining 420 in the battery system 122, e.g., the remaining charge in the battery system 122, with energy remaining represented on the second vertical axis 406.

FIG. 4 also depicts an exemplary drive cycle profile 430 as generated or modified by the heating performance system 160 during a heating performance mode. Portion 432 of drive cycle profile 430 corresponds to propulsion provided solely by the electric motor 134, and portion 434 of drive cycle profile 430 corresponds to operation of the internal combustion engine 132. As shown by drive cycle profile 430, the portion 434 corresponding to combustion engine operation occurs at the beginning of the drive cycle profile 430 (e.g., from 0 seconds to approximately 370 seconds), and the portion 432 corresponding only to electric motor operation occurs at the end of the drive cycle profile 430 (e.g., from 370 seconds to the conclusion of the drive cycle profile 430). As shown, the energy remaining 420 is relatively constant during portion 434 due to operation of the engine 132, and the energy remaining 420 decreases during portion 432 because the electric motor 134 is operating for propulsion.

The total energy 410 corresponds to the total energy 310 of FIG. 3 since the trip profile is identical. Moreover, even though the drive cycle profile 430 in FIG. 4 has been modified relative to the drive cycle profile 330 in FIG. 3, the percentage of time that the drive cycle operates with the internal combustion engine 134 (e.g., the respective energy load contribution) is approximately the same. This indicates that the electric motor (and the battery system 122) and the internal combustion engine 132 make approximately the same energy contributions for the trip profile in each of the respective drive cycles. As a result, the same amount of desired electric operation is maintained. However, since the heat from the internal combustion engine 132 may now be used earlier in the trip profile, heating performance is improved. In other words, the operator may be more comfortable over the entire trip as a result of the improved heating provided by the internal combustion engine 132. In effect, the heating performance mode enables the user to benefit from the improved heating performance that is a by-product of internal combustion engine operation by utilizing the internal combustion engine 134 earlier within the trip. Additionally or as an alternative, the earlier availability of the heat from the internal combustion engine 132 may be used to advantageously raise the temperature of certain engine components, such as the transmission. As a comparison, in the drive cycle profile 330 of FIG. 3, the internal combustion engine 132 does not operate until the end of the trip profile, thereby resulting in effective heating of the vehicle 100 only at the end of the trip profile. Upon generation of the modified drive cycle profile, the controller 170 may provide the modified drive cycle profile to the ECU 108 for implementation. Scenarios for generating or selecting the heating performance mode will be described below.

Figure 5:
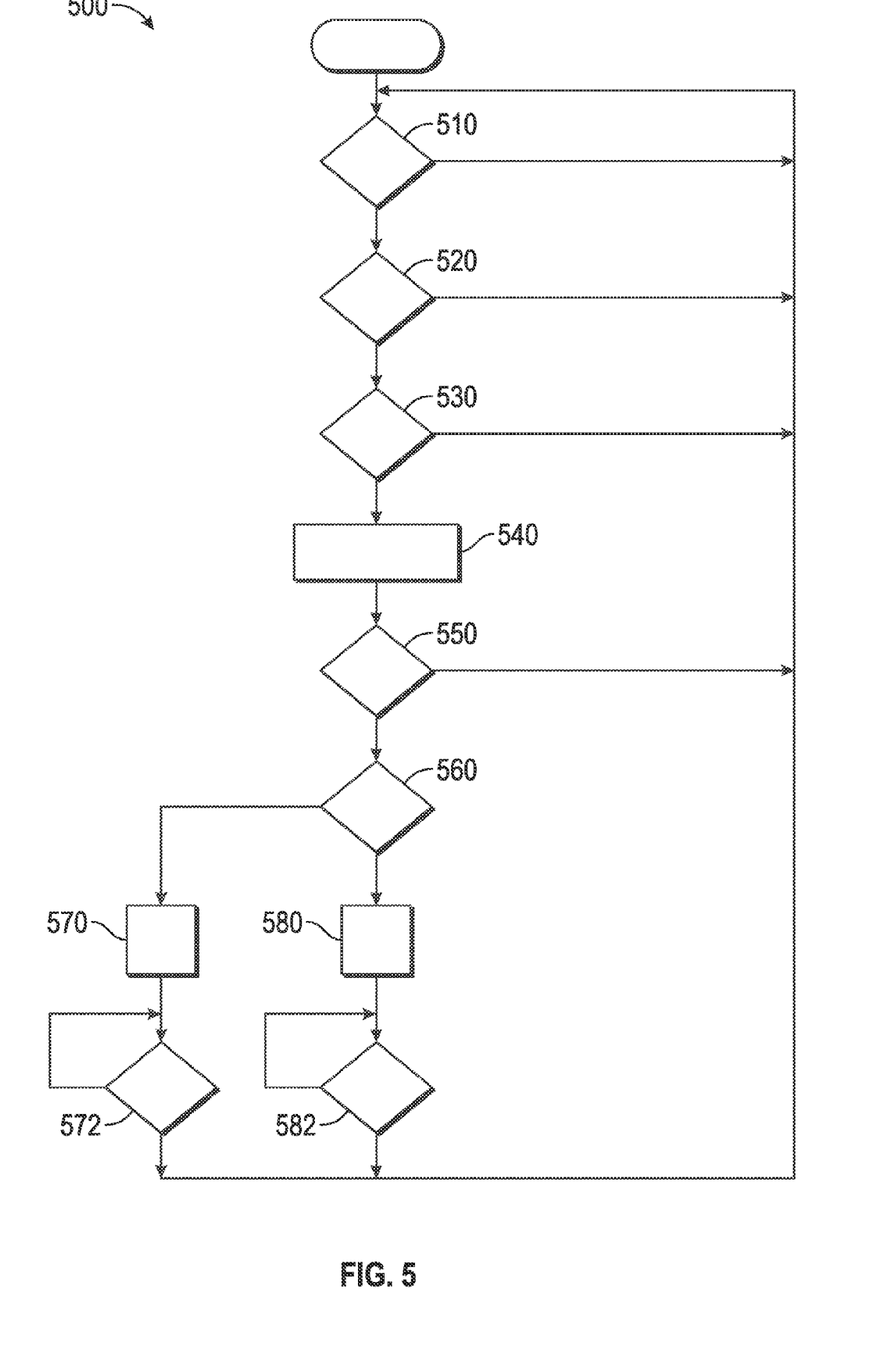
FIG. 5 is a flowchart of a method for improving heating performance in accordance with an exemplary embodiment.

Now that the structure of the heating performance system 160 has been described, an exemplary description of operation will be provided as a method 500, which is depicted as a flowchart in FIG. 5. Method 500 functions to improve heating performance in a vehicle, particularly a plug-in, hybrid, or extended range vehicle. In one exemplary embodiment, the method 500 may be implemented with the vehicle 100 discussed above. As such, FIG. 1 will be referenced in the discussion of FIG. 5 below.

In a first step 510, the heating performance system 160 (e.g., the controller 170) evaluates whether or not the driver has enabled the heating performance mode. The heating performance mode may be initiated by the operator via the user interface 162 and/or automatically. If the heating performance mode is not enabled, the heating performance system 160 returns to the start of the method 500 and continues to evaluate the enablement of the heating performance mode. If the heating performance mode is enabled, the heating performance system 160 continues to step 520.

In a second step 520, the heating performance system 160 (e.g., the controller 170) evaluates the ambient temperature. The temperature may be determined, for example, with the ambient sensor 150. Generally, the heating performance system 160 determines if the ambient temperature is suitable for heating and/or if the PTC heater 142 will be sufficient to heat the vehicle. As such, in the second step 520, the heating performance system 160 determines whether or not the temperature is between a predetermined low temperature and a predetermined high temperature. In one exemplary embodiment, the high temperature may be selected based on a number of factors, including a selection by the manufacturer, a selection by the operator (e.g., via user interface 142), operational parameters, regulatory, and/or environmental factors. Generally, the high temperature represents the temperature above which enhanced heating performance is no longer needed or desired (e.g., when heating is not necessary and/or the PTC heater 142 is sufficient). Typically, the predetermined low temperature is selected based on regulation and/or a function of the capabilities of the PTC heater 142 to operate at particularly low temperatures. Below the predetermined temperature, operation of the engine 132 is typically necessary to operate one or more vehicle functions, such as windshield defrosting. Accordingly, if the temperature is outside of the range in step 520, the method 500 returns to the start of the method 500. If the temperature is within of the range in step 520, the method 500 proceeds to step 530.

In a third step 530, the heating performance system 160 (e.g., the controller 170) determines if other compliance criteria are applicable and acceptable. As an example, a determination or evaluation regarding the fidelity of the GPS of the navigation module 164 may be considered. Generally, GPS provides an estimate of the accuracy of the constellations in their current configuration, which allows for the controller 170 (or other system) to predict an error surrounding a given position in real time. However, certain algorithms that require high precision may be disabled if a certain level of accuracy is not met. In such instances, and because the heating performance system 160 is making large quantitative energy assessments across a drive cycle, such compliance criteria may not be very stringent. Additionally, there are times when GPS data becomes temporarily inaccurate or unavailable. During these periods, the system 160 uses on board sensor data (wheel speeds/steering angle data) to "project" the location in space (e.g., "dead reckoning"

technique). However, in some instances, if these sensors are unavailable, operation of the heating performance system 160 may be disabled. Any suitable compliance criteria may be selected, and in some embodiments, such compliance criteria may be incorporated into a vehicle health system and/or omitted. If the compliance criteria are unacceptable, the method 500 returns to the start of the method 500. If the compliance criteria are acceptable, the method 500 proceeds to step 540.

In a fourth step 540, the heating performance system 160 (e.g., the controller 170) evaluates the trip and generates a trip profile. As noted above, the trip profile may predict the energy usage associated with a trip between a current location and a selected destination.

In a fifth step 550, the heating performance system 160 (e.g., the controller 170) determines whether or not the energy usage or load associated with the trip profile is greater than the charge range of the vehicle. If the load is not greater than the charge range of the vehicle, then the method 500 exits the heating performance mode and returns to the start of the method. Generally, if the load is not greater than the charge range, it indicates that the internal combustion engine operation will not be necessary, and therefore, unavailable to shift within the drive cycle profile. If the load is greater than the charge range of the vehicle, the method 500 proceeds to step 560. Additionally or alternately, in the fifth step 550, the heating performance system 160 may further consider the energy load needed to heat coolant to a temperature such that the total energy expended within the heating performance mode is approximately equal for the designated trip profile to the energy without the heating performance mode. If the energy load is greater, the heating performance mode is considered worthwhile and initiated by proceeding to step 560.

In a sixth step 560, the heating performance system 160 (e.g., controller 170) determines the operational sub-mode. The determination in step 560 to determine the operational sub-mode may be based on a number of factors. In one exemplary embodiment, this step 560 may be omitted such that the method 500 proceeds directly to step 570 to operate in engine-on sub-mode. However, other factors may be considered to operate in an alternate sub-mode 570, which may encompass a number of different types of operation, as described below.

In one exemplary embodiment, the heating performance system 160 determines the operational sub-mode by comparing the warming energy required to warm the vehicle to the anticipated engine energy associated with the trip profile ("anticipated engine energy"). If the warming energy is not substantially greater than the anticipated engine energy, then the method 500 proceeds to step 570 in an engine-on sub-mode. If the warming energy is substantially greater than the anticipated engine energy, then the method 500 may proceed to step 580 in the alternate sub-mode. In one exemplary embodiment, the warming energy may be approximately 25% greater than the anticipated engine energy to proceed to step 580 in the alternate sub-mode. Additional considerations in step 560 may be the charge of the battery system 122, length of the trip, and other optimization systems or techniques. More specific examples are provided below.

Referring to step 570, the heating performance system 160 (e.g., controller 170) initiates the engine-on sub-mode. In step 570, the engine 132 is operated in order to propel the vehicle, generally at the beginning of the trip, such as shown in the drive cycle profile 430 of FIG. 4. As noted above, the engine operation in step 570 generally corresponds to the engine operation that would otherwise be conducted at the end of the trip profile. As noted above, engine operation in step 570 generally occurs at the beginning of the trip such that the heat energy may be used in the passenger compartment as soon as possible. However, in some embodiments, it may be determined that the timing of engine operation may be more effective at a point other than the beginning of the drive cycle, such as during the middle or intermediate portions of the trip profile. This determination may be based on a number of factors, including passenger comfort, passenger selection, trip profile, anticipated energy usage, and other system optimization programs.

In step 572, the heating performance system 160 (e.g., controller 170) determines if the engine has reached a predetermined target temperature. The predetermined target temperature may be based on a number of factors, including customer comfort, operational performance, and fuel efficiency. If the engine temperature is less than the target temperature, the method 500 continues to evaluate the temperature in step 572. If the engine temperature is greater than or equal to the target temperature, the method 500 restarts, effectively exiting the warming operation of the sub-mode. Other parameters, such as a comparison in nominal engine load and modified engine load, may also be considered to exit or restart the method 500. As a result of this operation, approximately the same amount (or less) fuel is used as compared to if the engine had started at the end of the drive cycle. Moreover, the driver and passengers enjoy the benefit of the more effective heating performance resulting from operation of the engine 132 earlier in the trip, thereby also enabling the enjoyment and use of the residual heat in the passenger compartment throughout the trip, even after the engine 132 is no longer operating.

Referring to step 580, the heating performance system 160 (e.g., controller 170) initiates the alternate sub-mode. In this sub-mode, the drive cycle profile may modify the timing of the engine 132 to a position other than the end of the trip, similar to sub-mode of step 570. However, the engine operation may be more limited or delayed to increase the temperature of the passenger compartment to a more limited extent such that some heating assistance is provided, even if the warming energy to completely or more thoroughly warm the passenger compartment is too much of an energy cost. In one embodiment of the alternate sub-mode, the engine 132 operates only to a level to sustain the charge of the battery 122, and thus, provide some amount of heat assistance. Such operation of the engine 132 may occur at the beginning of the trip or during an intermediate portion of the trip. As described below, the alternate sub-mode of step 580 may be initiated to utilize the heat energy of the engine 132 for additional or other purposes.

In one exemplary embodiment of the alternate sub-mode of step 580, the timing of operation of the engine 132 may be modified or adjusted based on operation or capability of the PTC heater 142, charge of the battery system 122, and the trip profile. For example, if the heating performance system 160 determines that the capability of the battery to accept charge is poor (e.g. because of temperature or current charge), the system 160 may delay the initiation of the engine 132 (e.g., as compared to the engine-on sub-mode) and operate the PTC heater 142 to assist heating of the passenger compartment, as well as provide power to other systems of the vehicle. For example, as compared to operation depicted in FIG. 4, this embodiment of the sub-mode would offset the engine start time by a predetermined time to optimize or improve energy usage.

In a further embodiment of the alternate sub-mode, the length of the trip may be considered. For example, for shorter trips, the heat resulting from engine operation may be diverted to component heating, such as transmission heating. In some situations, the component heating may be initiated based on the needed and/or conditions of the components, e.g., when it would be particularly advantageous to prioritize heat energy to the transmission or certain types of vehicle fluids.

In step 582, the heating performance system 160 (e.g., controller 170) determines if the engine has reached a predetermined target temperature and/or whether another operating parameter has been reached. The predetermined target temperature may be based on a number of factors, including customer comfort and operational performance. If the engine temperature is less than the target temperature, the method 500 continues to evaluate the temperature in step 582. If the engine temperature is greater than or equal to the target temperature, the method 500 restarts, effectively exiting the warming operation of the sub-mode. In some embodiments, the one or more of the sub-modes in steps 570, 580 may be omitted.

In one exemplary embodiment, the method 500 is performed once at ignition or the beginning of a trip. In another embodiment, the method 500 may be performed iteratively, at predetermined intervals or time periods. In further embodiments, the method 500 may be performed continuously such that the above-referenced steps are continuously considered and executed as discussed above.

Accordingly, improved heating performance is provided. Particularly, heat from internal combustion may be used earlier in a trip to provide improved operator comfort or component warming. Even though heating performance is improved, operation may be controlled to result in the same relative contributions of energy usage of the internal combustion engine and the electric motor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for a vehicle, comprising:
    a battery system;
    an electric motor coupled to the battery system and configured to selectively provide power to the vehicle with energy from the battery system;
    an internal combustion engine configured to selectively provide power to the vehicle;
    a heating system configured to transfer heat from the internal combustion engine to a passenger compartment of the vehicle;
    an ambient temperature sensor configured to determine an ambient temperature; and
    a controller configured to receive the ambient temperature from the ambient temperature sensor and to operate the electric motor and the internal combustion engine according to one of a plurality of drive cycle profiles, the controller configured to select the drive cycle profile from the plurality of drive cycle profiles based on the ambient temperature, the plurality of drive cycle profiles including:
    a first drive cycle profile that commands power from the electric motor until the battery system reaches a predetermined state of charge and subsequently commands power from the internal combustion engine, and
    a second drive cycle profile that commands power from the internal combustion engine and subsequently commands power from the electric motor,
    wherein the controller is configured to select the first drive cycle profile when the ambient temperature is greater than the predetermined temperature and to select the second drive cycle profile when the ambient temperature is less than or equal to the predetermined temperature.

2. The system of claim 1, wherein the second drive cycle profile commands power from the internal combustion engine at a beginning of the second drive cycle profile.

3. The system of claim 1, wherein the controller is configured to receive a current location and an intended destination and to generate a trip profile based on the current location and the intended destination.

4. The system of claim 3, wherein the second drive cycle profile commands power from the internal combustion engine and subsequently commands power from the electric motor such that the battery system reaches an estimate of the predetermined state of charge at the intended destination.

5. The system of claim 4, wherein the plurality of drive cycles further includes a third drive cycle profile that commands power only from the electric motor, the controller configured to select the third drive cycle profile when the vehicle is predicted to reach the intended destination prior to the battery system reaching the predetermined state of charge.

6. The system of claim 3, wherein the first drive cycle profile defines a first internal combustion engine energy load contribution and a first electric motor energy load contribution for the trip profile and the second drive cycle profile defines a second internal combustion engine energy load contribution and a second electric motor energy load contribution for the trip profile, and wherein the first internal combustion engine energy load contribution is approximately equal to the second internal combustion engine energy load contribution.

7. The system of claim 1, wherein the controller is configured to receive an initial location and an intended destination and to generate a trip profile for a trip between the initial location and the intended destination, and wherein the controller is configured to select between the first drive cycle profile and the second drive cycle profile upon initiation of the trip.

8. The system of claim 7, wherein, during the trip, the controller is configured to receive a current location and to update the trip profile between the current location and the intended destination, and wherein the controller is configured to reselect between the first drive cycle profile and the second drive cycle profile based on the updated trip profile.

9. The system of claim 8, wherein, during the trip and when operating in accordance with the second drive cycle profile, the controller is configured to receive the ambient temperature at the current location and to switch to the first drive cycle profile when the ambient temperature is higher than the predetermined temperature.

10. The system of claim 8, wherein the predetermined temperature is a first predetermined temperature and wherein, during the trip and when operating in accordance with the second drive cycle profile, the controller is configured to receive an engine operating temperature and to switch to the first drive cycle profile when the engine operating temperature is higher than a second predetermined temperature.

11. A method for operating a vehicle with an electric motor that provides power to the vehicle with energy from the battery system, an internal combustion engine, and a heating system that transfers heat from the internal combustion engine to a passenger compartment of the vehicle, the method comprising the steps of:
receiving an initial location and an intended destination;
generating a trip profile for a trip between the initial location and the intended destination;
determining, with an ambient temperature sensor on the vehicle, an ambient temperature
receiving, by a controller on the vehicle, the ambient temperature;
selecting, by the controller on the vehicle, a drive cycle profile from a plurality of drive cycle profiles based on the trip profile and the ambient temperature, wherein the plurality of drive cycle profiles includes a first drive cycle profile and a second drive cycle profile, wherein the first drive cycle profile commands power from the electric motor until the battery system reaches a predetermined state of charge and subsequently commands power from the internal combustion engine, and wherein the second drive cycle profile commands power from the internal combustion engine and subsequently commands power from the electric motor,
wherein the selecting step includes selecting the first drive cycle profile when the ambient temperature is greater than a predetermined temperature and selecting the second drive cycle profile when the ambient temperature is less than or equal to the predetermined temperature; and
operating the vehicle according to the selected drive cycle profile.

12. The method of claim 11, further comprising the step of generating the first drive cycle profile and the second drive cycle profile for operating the vehicle according to the trip profile, wherein the second drive cycle profile commands power from the internal combustion engine and subsequently commands power from the electric motor such that the battery system reaches an estimate of the predetermined state of charge at the intended destination.

13. The method of claim 11, wherein the plurality of drive cycles further includes a third drive cycle profile that commands power only from the electric motor, and
wherein the selecting step includes selecting the third drive cycle profile when the vehicle is predicted to reach the intended destination prior to the battery system reaching the predetermined state of charge.

14. The method of claim 11, wherein the first drive cycle profile defines a first internal combustion engine energy load contribution and a first electric motor energy load contribution for the trip profile and the second drive cycle profile defines a second internal combustion engine energy load contribution and a second electric motor energy load contribution for the trip profile, and wherein the method further comprises generating the first drive cycle profile and second drive cycle profile such that the first internal combustion engine energy load contribution is approximately equal to the second internal combustion engine energy load contribution.

15. The method of claim 11, further comprising
receiving, during the trip, a current location;
generating an updated trip profile between the current location and the intended destination, and
selecting an updated drive cycle profile from the plurality of drive cycle profiles based on the updated trip profile.

16. The method of claim 15, wherein the step of receiving the ambient temperature includes receiving an updated ambient temperature at the current location, and wherein the step of selecting the updated drive cycle profile includes selecting the first drive cycle profile when the updated ambient temperature is higher than the predetermined temperature.

17. The method of claim 15, wherein the predetermined temperature is a first predetermined temperature, and wherein the method further comprises receiving an engine operating temperature, and wherein the step of selecting the updated drive cycle profile includes selecting the first drive cycle profile when the engine operating temperature is higher than a second predetermined temperature.

18. A heating performance system for a vehicle with an electric motor and an internal combustion engine, the heating performance system comprising:
a trip module configured to generate a trip profile for a trip between an initial location and an intended destination;
a drive cycle module coupled to the trip module and configured to generate at least a first drive cycle profile and a second drive cycle profile based on the trip profile, wherein the first drive cycle profile commands propulsion power from the internal combustion engine at a first position during the trip profile and the second drive cycle profile commands propulsion power from the internal combustion engine at a second position during the trip profile, earlier than the first position;
an ambient temperature sensor configured to determine an ambient temperature; and
a controller coupled to the drive cycle module and the ambient temperature sensor and configured to select between the first drive cycle profile and the second drive cycle profile based on the ambient temperature for operation of the vehicle according to the selected drive cycle profile, wherein the controller is configured to select the second drive cycle profile when the ambient temperature is less than a predetermined temperature such that heat from the internal combustion engine is directed into a passenger compartment of the vehicle earlier in the trip profile.

* * * * *